(12) United States Patent
Kogan et al.

(10) Patent No.: US 9,063,981 B2
(45) Date of Patent: Jun. 23, 2015

(54) METHOD AND SYSTEM FOR SEARCHING CONTACT LISTS QUICKLY—BY GROUP NAME, TAGS AND/OR METADATA

(75) Inventors: Sandra L. Kogan, Newton, MA (US); Mary E. Raven, Merrimack, NH (US); Anuphinh P. Wanderski, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2290 days.

(21) Appl. No.: 11/865,099

(22) Filed: Oct. 1, 2007

(65) Prior Publication Data

US 2009/0089316 A1    Apr. 2, 2009

(51) Int. Cl.
*G06F 17/30* (2006.01)
*H04M 1/2745* (2006.01)

(52) U.S. Cl.
CPC .... *G06F 17/30528* (2013.01); *G06F 17/30525* (2013.01); *H04M 1/274558* (2013.01)

(58) Field of Classification Search
USPC ................................ 707/706, 722
See application file for complete search history.

(56) References Cited

U.S. PATENT DOCUMENTS

| | | | |
|---|---|---|---|
| 6,557,004 B1 * | 4/2003 | Ben-Shachar et al. | 707/706 |
| 7,333,994 B2 * | 2/2008 | Glover et al. | 707/796 |
| 7,349,868 B2 * | 3/2008 | Tenorio | 705/26.62 |
| 7,953,750 B1 * | 5/2011 | Gupta | 707/769 |
| 8,265,925 B2 * | 9/2012 | Aarskog | 704/9 |
| 8,311,511 B2 * | 11/2012 | Kraft et al. | 455/410 |
| 8,627,222 B2 * | 1/2014 | Hartwell et al. | 715/764 |
| 2002/0169682 A1 | 11/2002 | Capek et al. | |
| 2005/0102368 A1 | 5/2005 | Forman et al. | |
| 2005/0182767 A1 * | 8/2005 | Shoemaker et al. | 707/10 |
| 2006/0117010 A1 | 6/2006 | Hakala | |
| 2006/0223489 A1 | 10/2006 | Furukawa | |
| 2006/0259474 A1 | 11/2006 | Granito | |
| 2008/0162701 A1 * | 7/2008 | Ryabchun et al. | 709/227 |
| 2009/0217199 A1 * | 8/2009 | Hara et al. | 715/808 |

* cited by examiner

*Primary Examiner* — Kim Nguyen
(74) *Attorney, Agent, or Firm* — BrianwoodHuang (57) ABSTRACT

A method and system for searching contact lists quickly, that provides searching of a contact list by user defined group names, attributes, and/or system defined metadata regarding contacts, groups and/or attributes. The visual display of contacts within the user's contact list user interface display may be configured to visually organize contacts into the groups they belong to, and/or to display the attributes associated with groups and/or contacts within the top level contact list display. Group and/or contact attributes may alternatively be accessed by selecting (e.g. clicking on) a group or contact. A quick search feature is provided that allows the contact list to be searched based on group name, attribute, and/or contact name, as well as based on group, contact and/or attribute metadata.

16 Claims, 8 Drawing Sheets

METHOD AND SYSTEM FOR SEARCHING CONTACT LISTS QUICKLY—BY GROUP NAME, TAGS AND/OR METADATA

FIELD OF THE INVENTION

The present invention relates generally to contact lists for computer based communication systems, and more specifically to a method and system for searching contact lists quickly—by group name, tags and/or metadata.

BACKGROUND OF THE INVENTION

With the increased popularity of instant messaging and other forms of synchronous and asynchronous on-line collaboration and communication, the contact lists (e.g. instant messaging buddy lists, electronic address books, etc.) provided by such systems to their users are becoming difficult to manage. Contact lists in existing systems can become very long. Contacts added to a contact list can be categorized in many different ways, often resulting in overlapping group memberships. All these factors ultimately make it difficult for users of existing system to quickly find the people they need to communicate with.

It would accordingly be desirable to have a new system for searching a contact list that enables a communication system user to quickly find relevant contacts for a communication.

SUMMARY OF THE INVENTION

To address the above described and other shortcomings of existing systems, a new method and system for searching contact lists quickly is disclosed. The disclosed system operates to provide searching of a contact list by user defined group names, tags (referred to herein as contact or group "attributes"), and/or system defined metadata regarding contacts, groups and/or attributes.

In the disclosed system, a user of a communication system is allowed to organize their contacts in their contact list within a number of contact groups. In addition, the user is allowed to associate attributes with contact groups and/or individual contacts. The visual display of contacts within the user's contact list user interface display may be configured to visually organize contacts into the groups they belong to, and/or to display the attributes associated with groups and/or contacts within the top level contact list display. Group and/or contact attributes may alternatively be accessed by selecting (e.g. clicking on) a group or contact. A quick search feature is provided that allows the contact list to be searched based on group name, attribute, and/or contact name, as well as based on group, contact and/or attribute metadata (e.g. date and time created or last modified, context information regarding creation or last modification, contact e-mail address, etc.).

Thus there is disclosed a new system for searching a contact list that enables a communication system user to quickly find relevant contacts for a communication.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
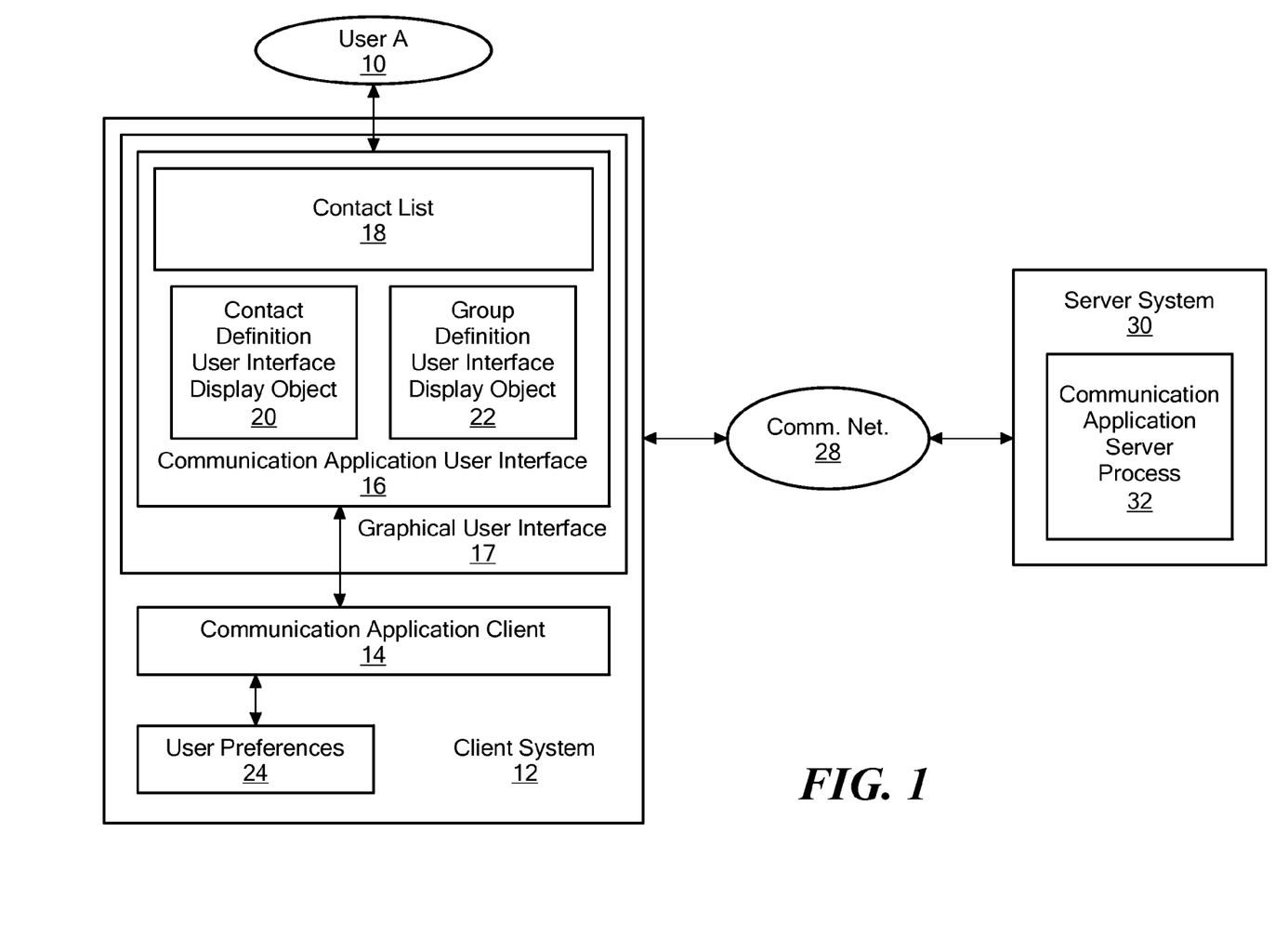
FIG. 1 is a block diagram showing an example of software and/or hardware components in an illustrative embodiment of the disclosed system.

FIG. 1 is a block diagram showing an example of software and/or hardware components in an illustrative embodiment of the disclosed system. As shown in FIG. 1, a Client System 12 includes a Communication Application Client 14 that provides a Communication Application User Interface 16 to a local user User A 10. The Communication Application Client 14 may, for example, be part of any specific type of synchronous communication system, such as an instant messaging system, and/or part of any specific type of asynchronous communication system, such as electronic mail ("e-mail"). Accordingly, the Communication Application Client 14 may be a client portion of an instant messaging system, and/or a client portion of an e-mail system.

The Communication Application User Interface 16 is generated by the Communication Application Client 14 within the Graphical User Interface 17 on Client System 12, and includes a Contact List 18, a Contact Definition User Interface Display Object 20, and a Group Definition User Interface Display Object 22. The Contact List 18 is a list of other users with whom the User A 10 may wish to communicate, and each entry in the Contact List 18 represents one such other user. Each entry in the Contact List 18 enables the User A 10 to quickly initiate a communication with the user represented with that entry, for example by selecting the entry, for example by clicking on the entry. In an embodiment in which the Communication Application Client 14 is part of an instant messaging system, then clicking on an entry in the Contact List 18 by User A 10 initiates an instant messaging session with the user represented by the entry (e.g. by bringing up an instant messaging session user interface object into which the User A 10 can enter an initial instant message to be immediately delivered to the other user). Similarly, in an embodiment in which the Communication Application Client 14 is part of an e-mail system, clicking on an entry in the Contact List 18 initiates the sending of an e-mail message to the user represented by the entry (e.g. by bringing up a message composition user interface with the other user's e-mail address preloaded into the destination address field).

The specific visual display layout of the Contact List 18, as well as other operational parameters of the Communication Application Client 14, may be responsive to configuration values stored by User A 10 in the User Preferences 24.

The entries in the Contact List 18 may be expressly entered by User A 10, and/or automatically generated by the Communication Application Client 14 based on previous communications made by User A 10. When User A 10 indicates that a new contact is to be added to the Contact List 18 (e.g. by clicking on a corresponding graphical button, dragging and dropping information such as a user name, screen name, and/or e-mail address over the Contact List 18, etc.), the disclosed system operates to generate the Contact Definition User Interface Display Object 20. The Contact Definition User Interface Display Object 20 enables User A 10 to enter information items into the disclosed system regarding the contact to be added (e.g. user name, screen name, e-mail address, associated groups, and/or user defined contact attributes), which are then stored locally by the Communication Application Client 14 and/or communicated to the Communication Application Server Process 32 located on the remote Server System 30. Such user defined information items regarding contacts in the Contact List 18 may accordingly be stored in a database or the like in the Client System 12 and/or Server System 30, and are searchable to find relevant contacts in the Contact List 18 through a quick search interface available to User A within the Contact List 18, and further described below.

When User A 10 indicates that a new group is to be defined in the Contact List 18 (e.g. by clicking on a corresponding graphical button, dragging and dropping information other than a user name, screen name, and/or e-mail address over the Contact List 18, etc.), the disclosed system operates to generate the Group Definition User Interface Display Object 22. The Group Definition User Interface Display Object 22 enables User A 10 to enter information items into the disclosed system regarding a group to be added (e.g. group name, user names, screen names, e-mail addresses, etc. of contacts to be included in the group, and/or user defined attributes of the group), which are stored locally by the Communication Application Client 14 and/or communicated to the Communication Application Server Process 32 located on the remote Server System 30. Such user defined information items regarding groups in the Contact List 18 may accordingly be stored in a database or the like in the Client System 12 and/or Server System 30, and are searchable to find relevant groups of contacts in the Contact List 18 through a quick search interface available to User A within the Contact List 18, and further described below.

The Client System 12 of FIG. 1 may be any specific type of a computer system or intelligent electronic device, such as a desktop, laptop, or palmtop computer system, or a personal digital assistant, cell phone, or other electronic device. The Client System 12 of FIG. 1 may include or control a display device capable of displaying a graphical user interface (e.g. the Graphical User Interface 16) to a local user (e.g. User A 10), such as a liquid crystal display (LCD), cathode ray tube (CRT), interferometric modulator display (IMOD), light emitting diode (LED), or the like.

Those skilled in the art will recognize that the Communication Application Client 14 and Server Process 32 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client System 12 and Server System 30 of FIG. 1 may include one or more processors, and program storage, such as memory, for storing program code executable on such processors, as well as input/output devices and/or interfaces. In the example of FIG. 1, the Client System 12 and Server System 30 are interconnected through a computer or data Communication Network 28 (e.g. the Internet, a Local Area Network, etc.) through one or more of such input/output devices or interfaces, and through which may further be provided communication to a number of other client systems and/or other server systems.

Figure 2:
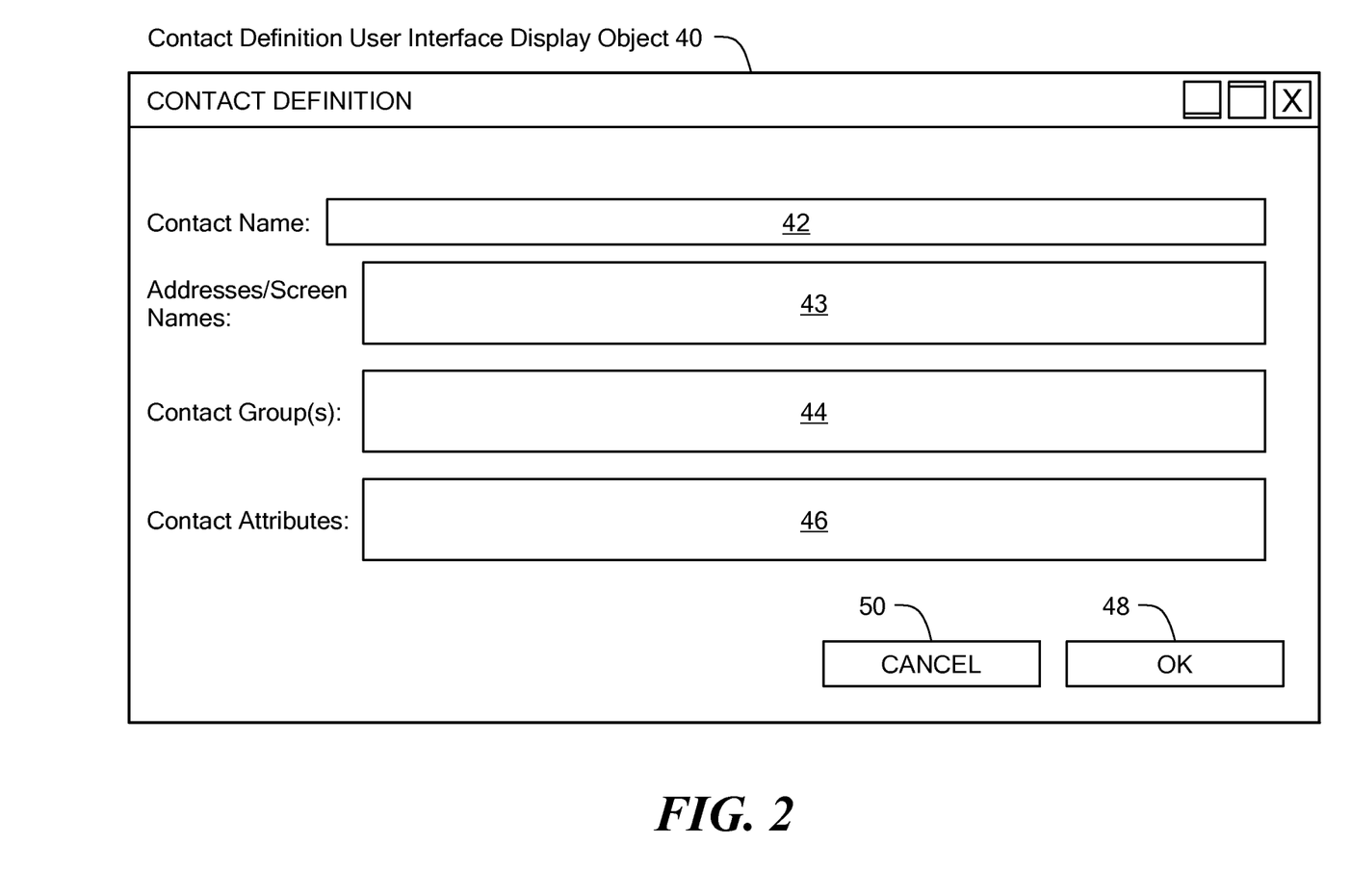
FIG. 2 is a simplified screen shot showing an example of a contact definition user interface display object generated in an illustrative embodiment.

FIG. 2 is a simplified screen shot showing an example of a Contact Definition User Interface Display Object 40 generated in an illustrative embodiment. As shown in FIG. 2, the Contact Definition User Interface Display Object 40 enables a local user (e.g. User A 10) to define a new contact or modify the definition of an existing contact for a contact list. To this end, the Contact Definition User Interface Display Object 40 includes a number of user interface display objects that allow a user to enter or modify information (e.g. contact name, addresses/screen names, associated groups, attributes, etc.) relating to a newly defined or previously existing contact. For example, the Contact Definition User Interface Display Object 40 includes a Contact Name field 42 for entry of a user name, nickname, etc., to be used to quickly refer to the contact, an Addresses/Screen Names field 43 for entry of e-mail addresses and/or screen names to be associated with the contact, Contact Groups field 44 for entry of names of groups that the contact is to be contained within, and a Contact Attributes field 46 for entry of one or more text attributes (e.g. "tags") that are to be associated with the contact. The attributes associated with a contact may be any specific type of content or pointer, such as text, links (e.g. Uniform Resource Locators (URLs)), etc. As described further below, the contact can subsequently be retrieved based on a match between a quick search query and at least a portion of one or more attributes associated with it.

The new or modified contact definition is stored when the user clicks on the OK button 48, or cancelled when the user clicks on the CANCEL button 50.

Figure 3:
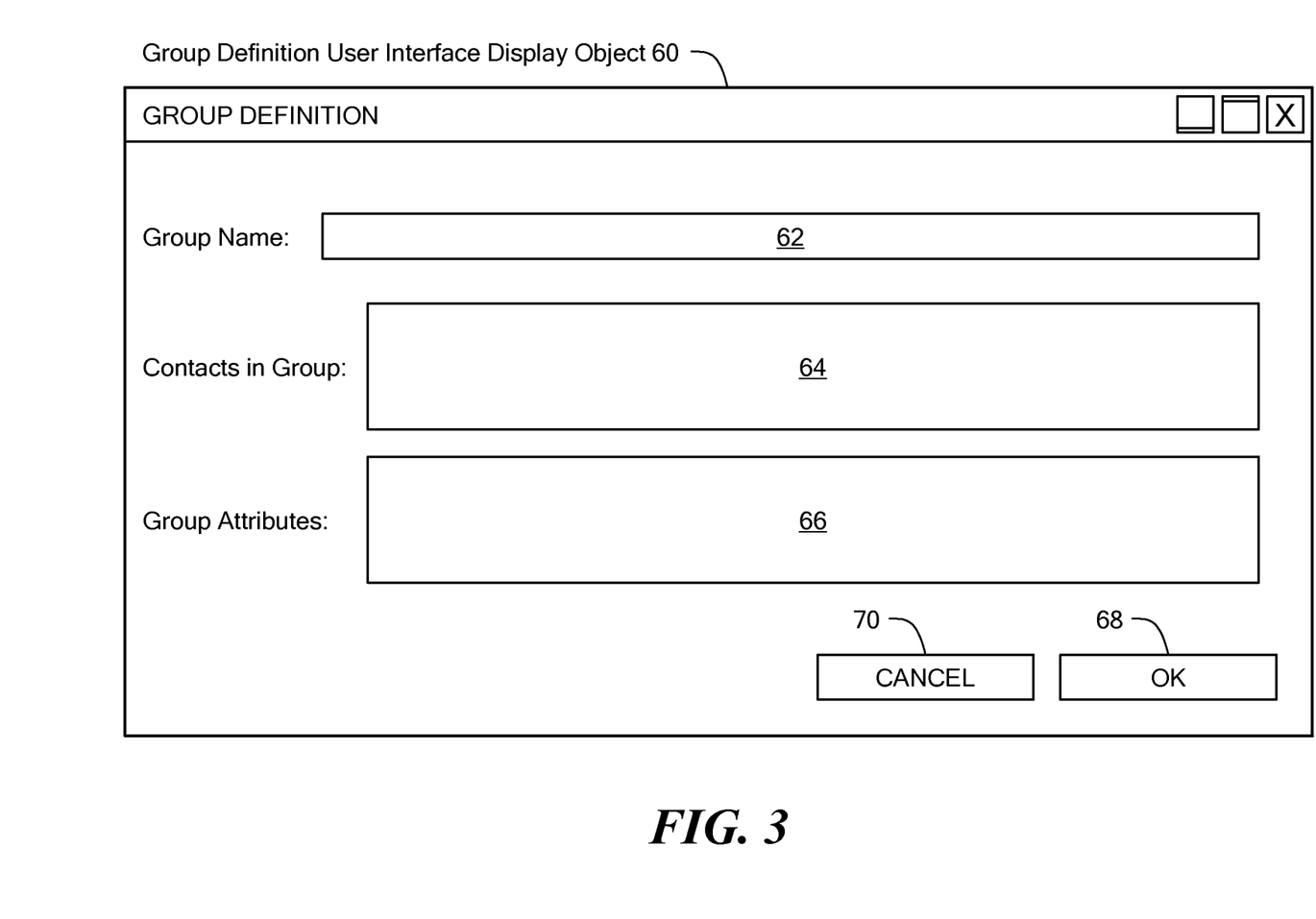
FIG. 3 is a simplified screen shot showing an example of a group definition user interface display object generated in an illustrative embodiment.

FIG. 3 is a simplified screen shot showing an example of a Group Definition User Interface Display Object 60 generated in an illustrative embodiment. As shown in FIG. 3, the Group Definition User Interface Display Object 60 enables a local user (e.g. User A 10) to define a new group or modify an existing group for a contact list. To this end, the Group Definition User Interface Display Object 60 includes a number of user interface display objects that allow a user to enter or modify information (e.g. group name, contacts within the group, group attributes, etc.) relating to a newly defined or previously existing group. For example, the Group Definition User Interface Display Object 60 includes a Group Name field 62 for entry of a group name to be used to quickly refer to the group, a Contacts in Group 64 for entry of contacts (e.g. by way of contact name, e-mail addresses and/or screen names, etc.) to be included in the group, and a Group Attributes field 66 for entry of one or more text attributes (e.g. "tags") that are to be associated with the group. The attributes associated with a group may be any specific type of content or pointer, such as text, links (e.g. Uniform Resource Locators (URLs)), etc. As described further below, the group can subsequently be retrieved based on a match between a quick search query and at least a portion of one or more attributes associated with it.

The new or modified group definition is stored when the user clicks on the OK button 68, or cancelled when the user clicks on the CANCEL button 70.

Groups and attributes may, for example, be used to refer to the different roles that contacts have in their jobs. This use of the disclosed contact attributes may help address the problem that people may work in many different capacities in different groups (sometimes making it difficult to find the right contact within the contact list), and also enables searching by contact role. For example, a given contact may serve as a project manager for one team, designer on another team, and later on become a director of a company. If such a person appears within different groups from the contact list (e.g. within groups consisting of Team A, Product X, and Company ABC), a user could make sure it's the same person across all the groups by defining and/or searching role attributes associated with that person to obtain search results indicating that the person was tagged with different roles within each group, i.e. showing the contact with a project manager attribute within the group Team A, with a designer attribute within the group Product X, and now with a Director of Company attribute within the group ABC.

Figure 4:
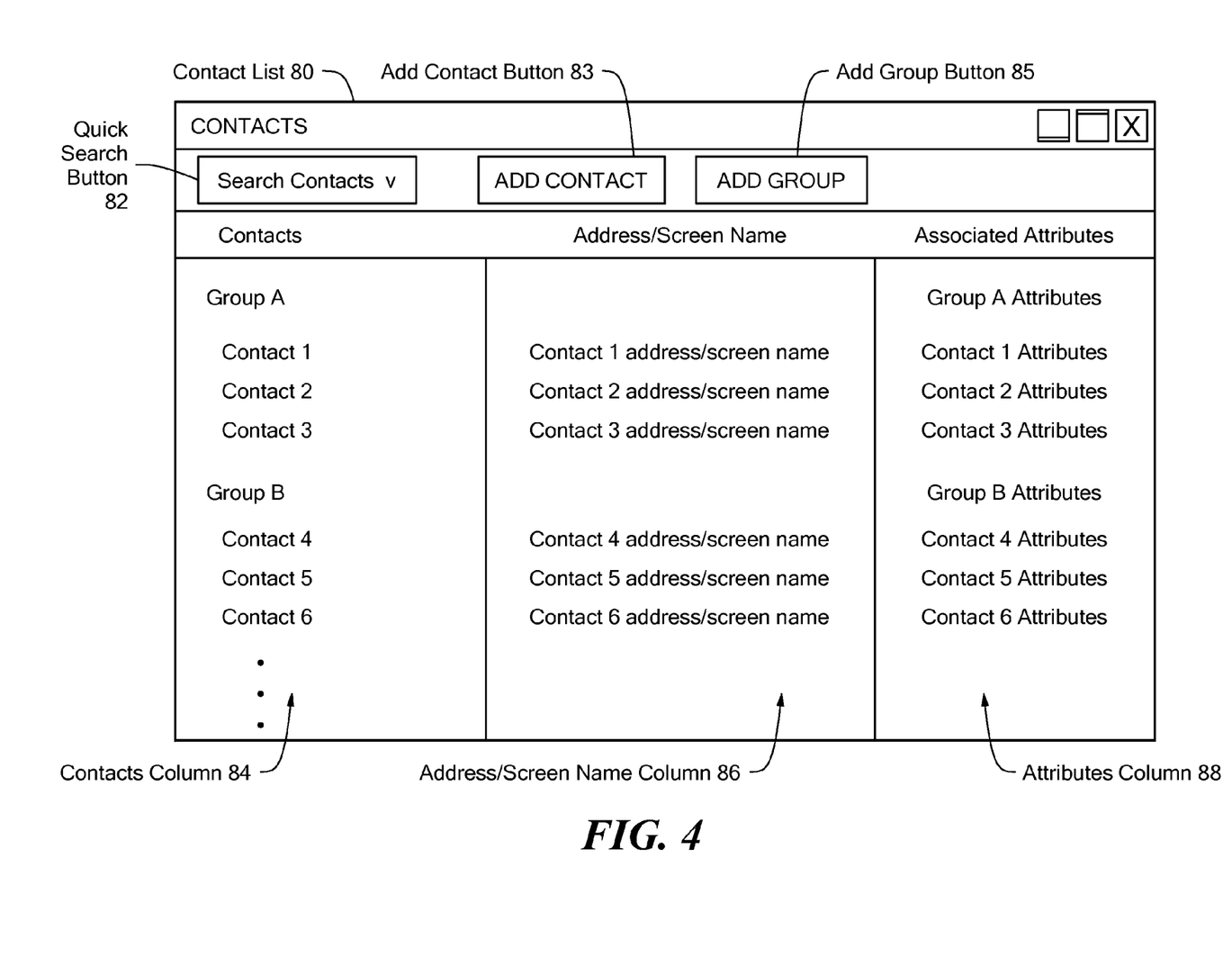
FIG. 4 is a simplified screen shot showing an example of a contact list user interface display object generated in an illustrative embodiment.

FIG. 4 is a simplified screen shot showing an example of a Contact List User Interface Display Object 80 generated in an illustrative embodiment. In the example of FIG. 4, the Contact List User Interface Display Object 80 is shown including a Quick Search Button 82, an Add Contact Button 83, an Add Group Button 85, a Contact Column 84, an Address/Screen Name Column 86, and an Attributes Column 88. When clicked on, the Quick Search Button 82 provides a pull down menu of contact searches, as further shown in FIG. 5. The Quick Search Button 82 thus provides a user interface to quick searching across the contacts in the contact list by contact name, address/screen name, group name, contact attribute, and/or group attribute.

The Add Contact Button 83, when clicked on, causes the disclosed system to display a contact definition user interface display object (e.g. Contact Definition User Interface Display Object 40 of FIG. 2). The Add Group Button 85, when clicked on, causes the disclosed system to display a group definition user interface display object (e.g. Group Definition User Interface Display Object of FIG. 3). Those skilled in the art will recognize that the use of buttons such as 83 and 85 shown in FIG. 4 is just one possible way of triggering the display of contact definition and/or group definition user interface objects, and that any other specific user interface mechanism may be used in the alternative or additionally for this purpose as appropriate for a given embodiment.

Further in the example of FIG. 4, a Contact Column 84 displays the names (e.g. user names or nicknames) of all contacts in the contact list. The names in Contacts Column 84 are shown organized by groups, such that Contact 1, Contact 2, and Contact 3 are displayed under Group A, and Contact 4, Contact 5, and Contact 6 are displayed under Group B. In one embodiment of the disclosed system, when the user clicks on a name in the Contact Column 84, a communication (e.g. instant messaging session or e-mail message) is initiated with that contact.

The Address/Screen Name Column 86 displays e-mail addresses or screen names for each contact named in column 84. For example, in an embodiment based on an instant messaging system, column 86 would display the screen name(s) associated with each contact. Alternatively, in an embodiment based on an e-mail system, column 86 would display the e-mail address(es) associated with each contact.

The Attributes Column 88 displays the user defined attributes (i.e. tags) associated with each contact in the contact list. Accordingly, any text, pointers, images, etc. that a user has associated with a given contact in the contact list will be displayed in the Attributes Column 88.

The specific format of a contact list displayed by an embodiment of the disclosed system may be user configurable, e.g. based on the user configuration settings stored in the User Preferences shown in FIG. 1. Accordingly, user configuration settings may determine the specific columns of information displayed for each contact in the contact list. Moreover, whether contacts are displayed within their associated groups may be determined based on such a configuration setting. Alternatively, a configuration setting may indicate that the order in which contacts are displayed in the Contact List User Interface Display Object 80 based on some other factor. For example, a user configuration setting may be provided that causes contacts to be listed alphabetically, or grouped together by associated attributes, or in some other manner that may be independent of the group associations of the contacts. A configuration setting may alternatively indicate that the contacts in the Contact List User Interface Display Object 80 are to be displayed within their associated groups, but that the groups are to be displayed contiguously adjacent to other groups associated with the same attributes. In another possible configuration, only the group names would be initially displayed in the Contact List User Interface Display Object 80, and the user would have to click on a group to see the contacts contained within it.

Figure 5:
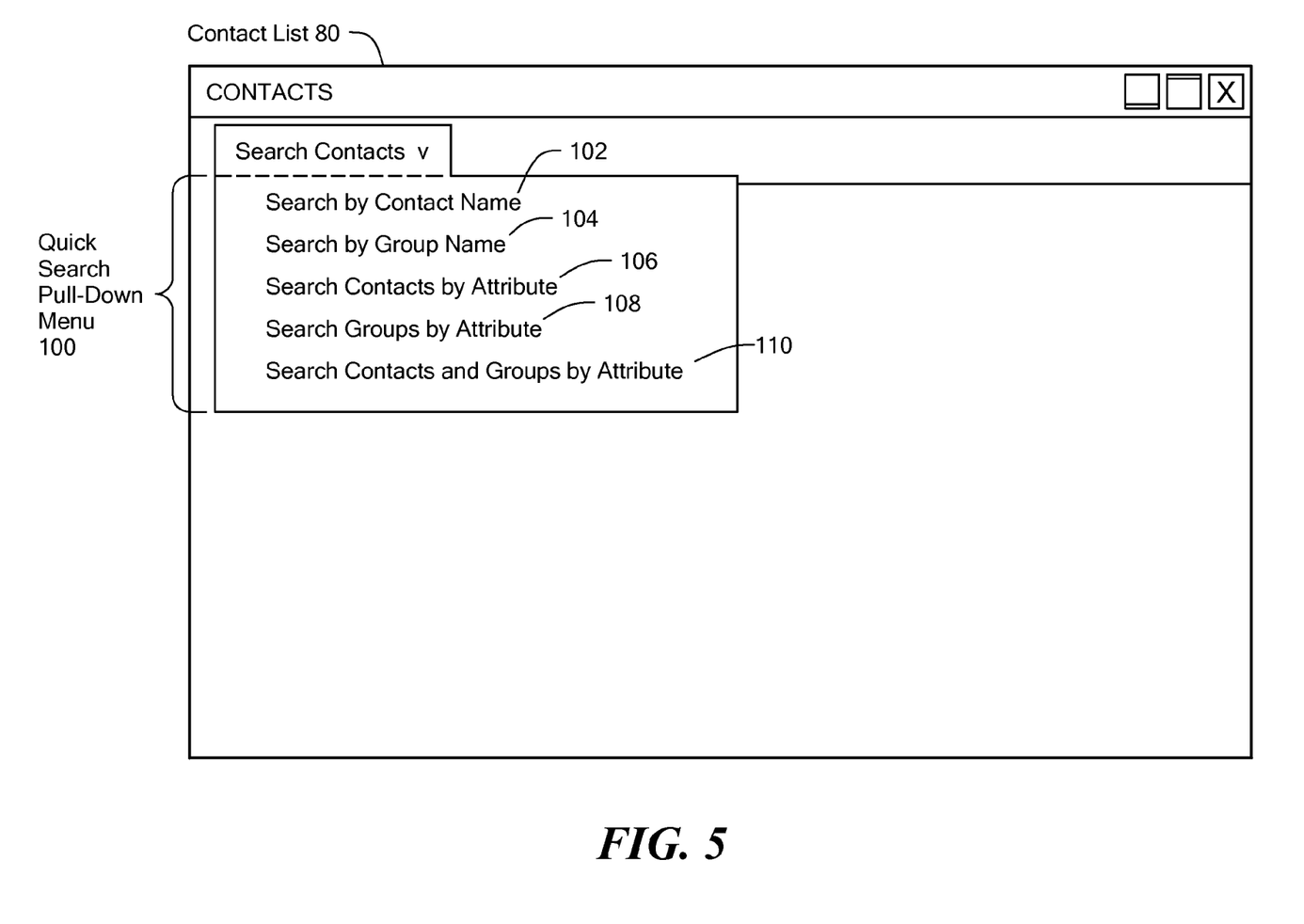
FIG. 5 is a simplified screen shot showing the example of the contact list user interface display object of FIG. 4 with an example of a quick search user interface display object.

FIG. 5 is a simplified screen shot showing the example of the Contact List User Interface Display Object of FIG. 4 with an example of a quick search user interface display object displayed in response to the user clicking on the Quick Search Button 82 of FIG. 4: Quick Search Pull-Down Menu 100. Quick Search Pull-Down Menu 100 includes a number of selectable search options, shown in the example of FIG. 5 as including a Search by Contact Name option 102, a Search by Group Name option 104, a Search Contacts by Attribute option 106, a Search Groups by Attribute option 108, and a Search Contacts and Groups by Attributes option 110. In response to a user selecting (e.g. clicking on) the Search by Contact Name option 102, the disclosed system displays a user interface object (e.g. pop-up window or the like) that enables the user to enter a search query (e.g. text) to be matched against the names of contacts in the contacts list in order to generate a result set of contacts matching the search query. The contacts having names matching the search query are then displayed as a current contact list (e.g. within the Contact List User Interface Display Object 80), or in a separate results window or the like.

Similarly, in response to a user selecting (e.g. clicking on) the Search by Group Name option 104, the disclosed system displays a user interface object (e.g. pop-up window or the like) that enables the user to enter a search query (e.g. text) to be matched against the names of groups in the contacts list in order to generate a result set of groups matching the search query. The groups having names matching the search query are then displayed as a current contact list (e.g. within the Contact List User Interface Display Object 80), or in a separate results window or the like.

In response to a user selecting (e.g. clicking on) the Search Contacts by Attribute option 106, the disclosed system displays a user interface object (e.g. pop-up window or the like) that enables the user to enter a search query (e.g. text) to be matched against the attributes associated with contacts in the contacts list in order to generate a result set of contacts having attributes matching the search query. The contacts having associated attributes matching the search query are then displayed as a current contact list (e.g. within the Contact List User Interface Display Object 80), or in a separate results window or the like.

In response to a user selecting (e.g. clicking on) the Search Groups by Attribute option 108, the disclosed system displays a user interface object (e.g. pop-up window or the like) that enables the user to enter a search query (e.g. text) to be matched against the attributes associated with groups in the contacts list in order to generate a result set of groups having attributes matching the search query. The groups having associated attributes matching the search query are then displayed as a current contact list (e.g. within the Contact List User Interface Display Object 80), or in a separate results window or the like.

In response to a user selecting (e.g. clicking on) the Search Contacts and Groups by Attribute option 108, the disclosed system displays a user interface object (e.g. pop-up window or the like) that enables the user to enter a search query (e.g. text) to be matched against the attributes associated with contacts and groups in the contacts list in order to generate a result set of contacts and groups having attributes matching the search query. The contacts and groups having associated attributes matching the search query are then displayed as a current contact list (e.g. within the Contact List User Interface Display Object 80), or in a separate results window or the like.

Figure 6:
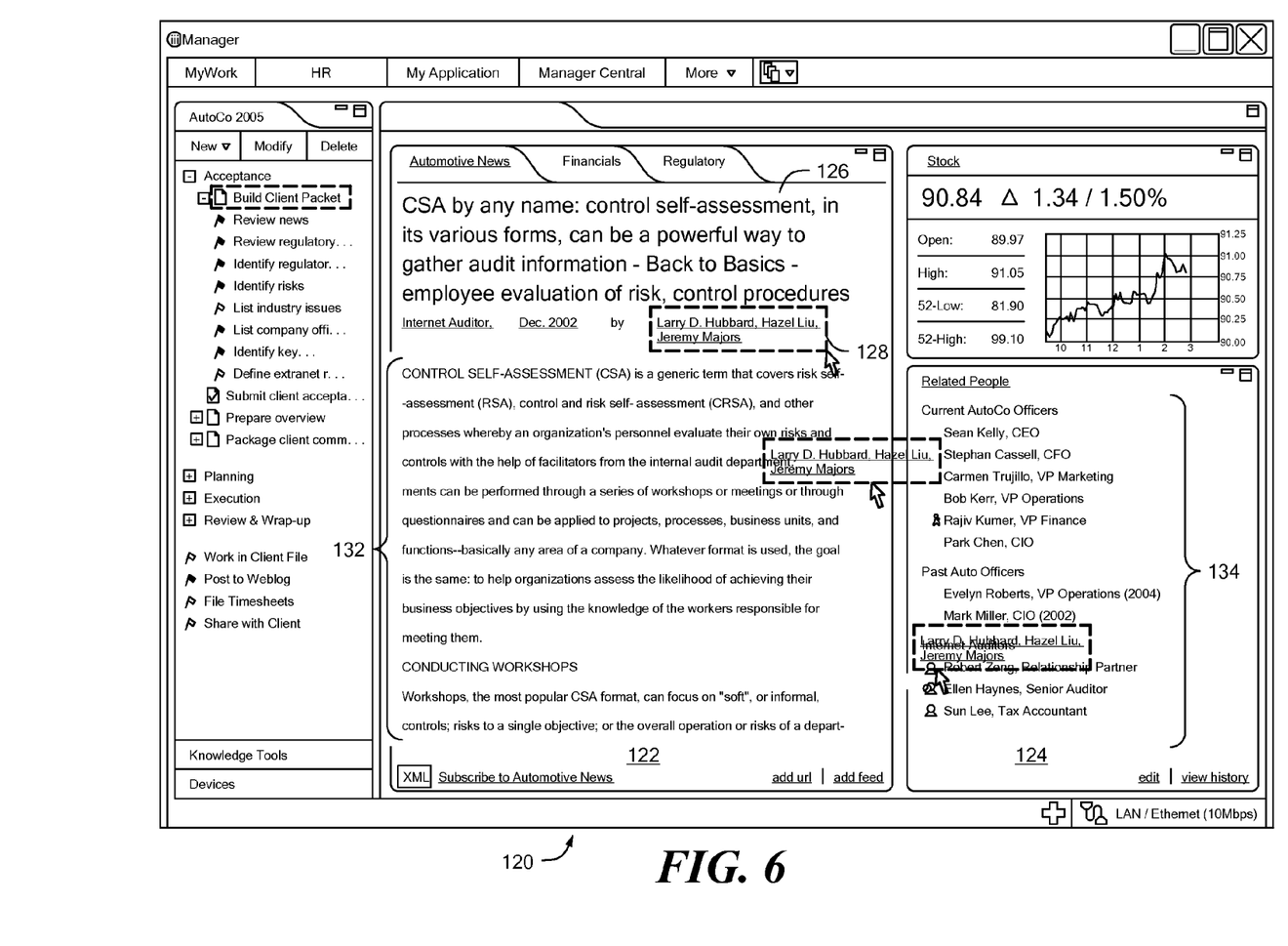
FIG. 6 is a simplified screen shot showing an example of a Web Browser user interface during operation of an illustrative embodiment.

FIG. 6 is a simplified screen shot showing an example of a Web Browser User Interface 120 during operation of an illustrative embodiment of the disclosed system. As shown in FIG. 6, a Currently Loaded Web Page Display Area 122 displays a currently loaded Web page that is an article including an title shown as Article Title 126, names of the article authors that are links to their e-mail addresses, shown as Article Authors 128, and an Article Body 132. If while reading the article shown in the Currently Loaded Web Page Display Area 122, the user determines that they are interested in following up on the contents of the article with the article authors, but cannot at the moment, or if they have questions for the authors or questions about the article in general, they may wish to add the Article Authors 128 to the Contact List 134 shown in the Contact List Portlet 124. However, the user may also know that if they simply add the names of Article Authors 128 and e-mail addresses to the Contact List 134, they will later likely not remember why they were put there. Accordingly, the user can add the article authors to the Contact List 134 in such a way that the group membership and/or associated attributes for the authors will remind the user of their relevance. For example, the user could add the article authors to the Contact List 134 and associate attributes with them including at least a portion of the Article Title 126, and/or a text note describing the questions that the user wants to ask the authors. In addition, the user can associate a link to the article (e.g. from a Web Browser location bar or the like) as a contact attribute for each of the article authors in their corresponding entries in the Contact List 134. Alternatively, the user can define a group to contain the article authors in the Contact List 134, and associate the same attributes listed above with the group, so that the group attributes will remind the user of the context in which the article authors were added to the Contact List 134. Moreover, in the case where a new group is defined to contain the article authors, the name of the article itself could be used as the name of the group.

In one embodiment of the disclosed system, as illustrated in FIG. 6, dragging and dropping the names of the article authors, the e-mail addresses of the article authors, over the Contact List 134 causes contact definition user interface display objects to be displayed that are pre-loaded with the article author names and/or e-mail addresses of the authors. Alternatively, dragging and dropping the names of the article authors, the e-mail addresses of the article authors, over the Contact List 134 causes the authors to be automatically added to the Contact List 134. In the event that there is a conflict between the information dragged into the Contact List 134 and an existing entry, the user may be presented with user interface options allowing the user to either cancel the addition to the contact list, or to override the existing entry with the new contact information.

Similarly, in one embodiment of the disclosed system, dragging and dropping the Article Title 126 over the Contact List 134 causes a group definition user interface display object to be displayed that is pre-loaded with the article title as the group name. Alternatively, dragging and dropping the article title over the Contact List 134 causes the article name to be automatically added as a group to the Contact List 134.

Figure 7:
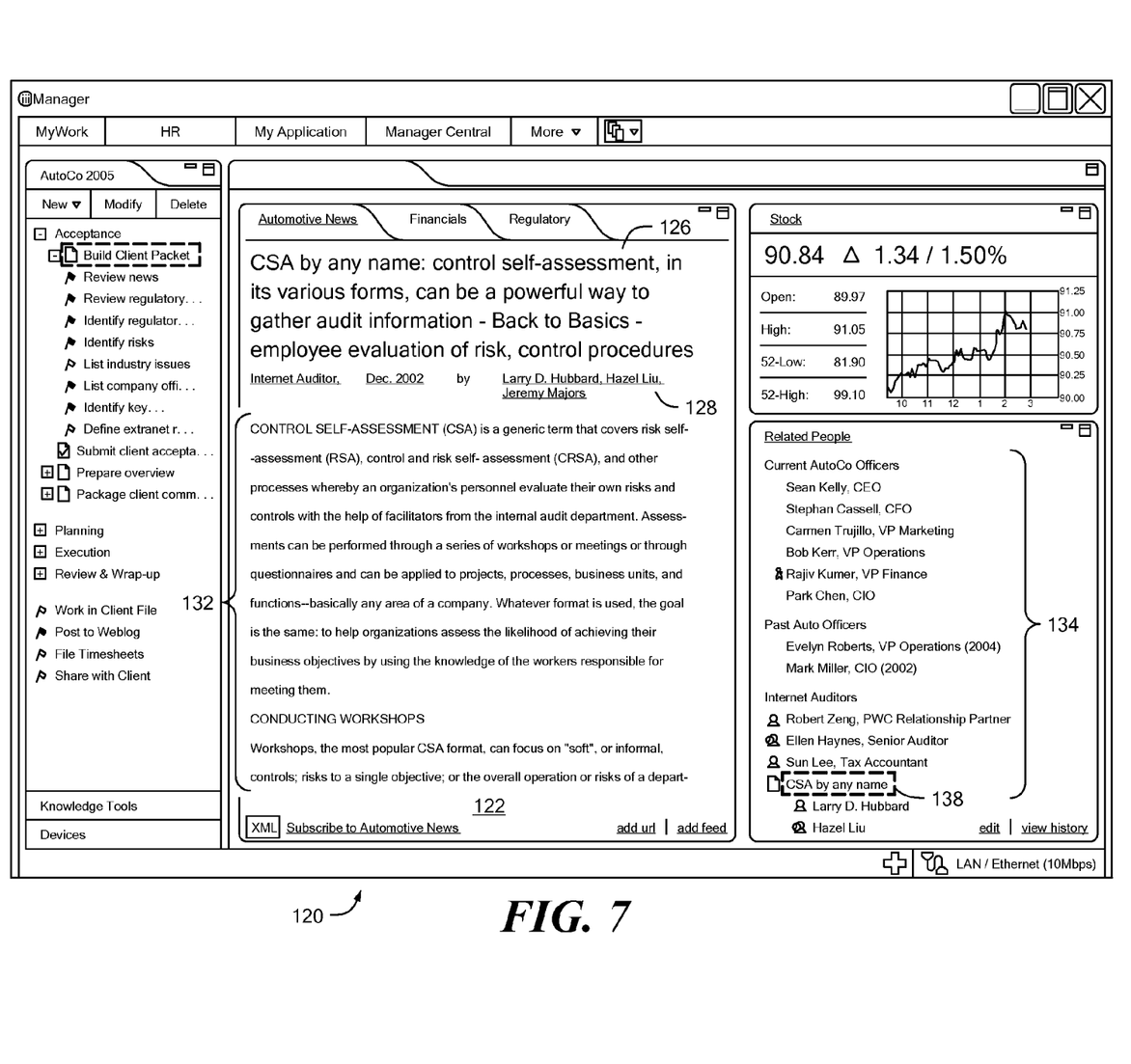
FIG. 7 is a simplified screen shot showing the example of the Web Browser user interface of FIG. 6 following creation of a new contact group based on information in a loaded Web page.

FIG. 7 is a simplified screen shot showing the example of the Web Browser user interface of FIG. 6 following creation of a new contact group based on information in the loaded Web page shown in FIG. 6. As shown in FIG. 7, a new group 138 that has a name matching at least a portion of the article title has been created in the Contact List 134, and the new group contains the authors of the article as contacts.

Figure 8:
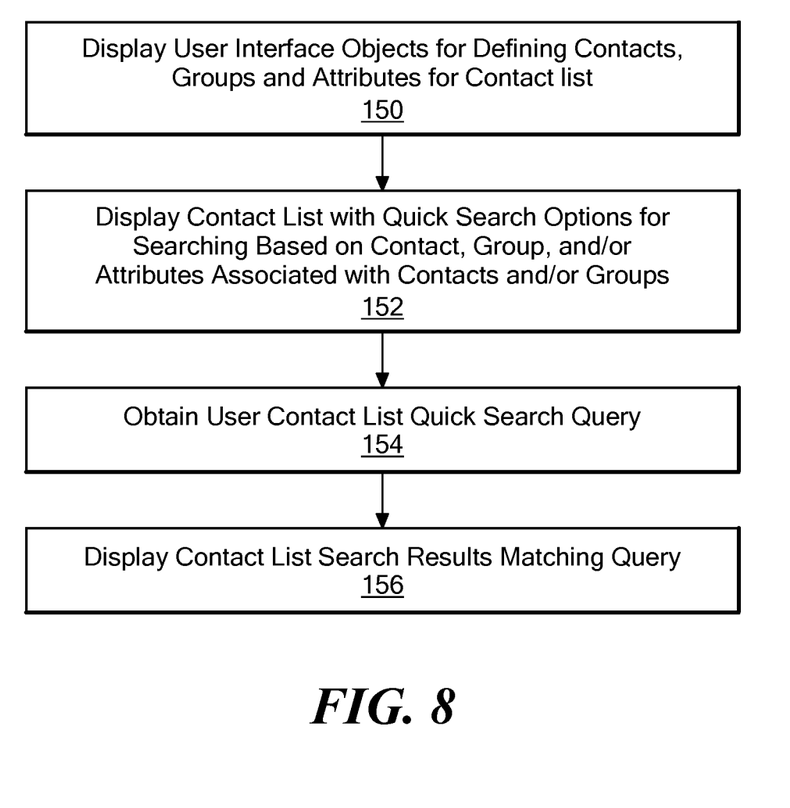
FIG. 8 is a flow chart showing an example of steps performed in an illustrative embodiment.

FIG. 8 is a flow chart showing an example of steps performed in an illustrative embodiment. As shown in FIG. 8, at step 150, the disclosed system displays user interface display objects for defining contacts, groups, and attributes associated with those contact and/or groups within the contact list. At step 152, the disclosed system displays a contact list with quick search options enabling the user to search the contact list based on contact name, group name, and/or based on user defined attributes associated with contacts and/or groups. At step 154, the disclosed system receives a search query from the user for searching the contact list, e.g. via a field in a pop-up window or the like. The search query received at step 154 may be user-input text for matching against contact names, group names, contact attributes, and/or group attributes. At step 156, the disclosed system displays contact list search results matching the search query received at step 154. Such results may be displayed to the user as a newly populated contact list in a contact list user interface display object, or alternatively in a separate user interface window or the like created for the purpose of displaying the search results.

The disclosed system may further be embodied to provide for storage and searching of metadata associated with contacts within the contact list. In such an embodiment, contact metadata is automatically stored by the underlying system (e.g. communication application or the like), and may include group, contact and/or attribute metadata (e.g. date and time created or last modified, context information regarding creation or last modification, contact e-mail address, etc.). While automatic storage of metadata by the underlying system may be provided in such an embodiment, contact attributes may still be expressly entered by the user, or automatically collected based on monitoring of the user's communication application activities, etc. The stored metadata may be searchable. For example, in one embodiment, the stored metadata is searched in response to a user query (e.g. in a contact search by attribute) that doesn't provide an immediate match in the contact list. Alternatively, one or more separate metadata search options may be provided to the user in a user interface object such as the Quick Search Pull-Down Menu 100 of FIG. 5 (e.g. Search Contact Metadata, Search Group Metadata, Search Attribute Metadata, etc.).

In an exemplary embodiment, the stored metadata is not displayed to the user within the contact list display object, but is displayed in brackets (i.e., "< >") following matching entries in the search results. For example, if a user typed "ABC" as a contact list search query, the search performed by an embodiment of the disclosed system would result in a user interface display of a list of contact names from the contact list such as the following:

Tom Smith <ABC Company>
Gail Adams <ABC Industry>
Shirley McDougal <ABC@email.com>

While the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method of providing quick searching of a contact list for an electronic communication system, comprising:
    displaying a contact list search user interface display object to a user, said contact list search user interface display object including a plurality of independently selectable search options including a search contacts by attributes search option and a search groups by attributes search option;
    displaying, responsive to said user selecting said search contacts by attributes search option, a user interface object enabling said user to search attributes associated with contacts in said contacts list to generate a result set of contacts having attributes matching a search query; and
    displaying, responsive to said user selecting said search groups by attributes search option, a user interface object enabling said user to search attributes associated with groups in said contacts list to generate a result set of groups having attributes matching a search query.

2. The method of claim 1, further comprising:
    wherein said independently selectable search options further include a search by metadata search option; and
    displaying, responsive to said user selecting said search by metadata search option, a user interface object enabling said user to search said contact list based on context information associated with each contact and each group in said contact list.

3. The method of claim 2, further comprising:
    automatically associating said context information with each contact and each group in said contact list at the time each contact and each group is created.

4. The method of claim 1, further comprising:
    obtaining a user defined first attribute for association with a contact in said contact list;
    receiving, through said user interface object enabling said user to search attributes associated with contacts in said contacts list, a search query including said first attribute; and
    displaying, responsive to said receipt of said search query including said first attribute, a first result set including said contact.

5. The method of claim 4, wherein said obtaining said user defined attribute comprises displaying a contact definition user interface display object including a contact attributes field and inputting said user defined first attribute from said contact attributes field.

6. The method of claim 5 wherein said displaying said contact attribute definition user interface display object is responsive to a user adding said contact to said contact list.

7. The method of claim 5 wherein said displaying said contact attribute definition user interface display object is responsive to a user selecting said contact in said contact list.

8. The method of claim 5, further comprising:
    obtaining a group name for association with said contact;
    receiving a second search query including said group name; and
    displaying, responsive to said receipt of said second search query including said group name, a second result set including said contact.

9. The method of claim 8, wherein said contact definition user interface display object further includes a group name field, and further comprising inputting said group name from said group name field.

10. The method of claim 8, wherein said obtaining said group name comprises displaying a group name definition user interface display including a group name field and inputting said group name from said group name field.

11. The method of claim 8, further comprising:
    obtaining a user defined second attribute for association with said group name;
    receiving a third search query including said second attribute; and
    displaying, responsive to said receipt of said third search query including said second attribute, a third result set including said contact.

12. The method of claim 11, wherein said obtaining said group name comprises displaying a group name definition user interface display including a group attributes field and inputting said second attribute from said group name field.

13. The method of claim 12, further comprising displaying said first attribute in said contact list in visual proximity to said contact.

14. The method of claim 13, further comprising displaying said second attribute in said contact list in visual proximity to said group name.

15. A system including a computer readable memory, said computer readable memory having program code stored thereon for providing quick searching of a contact list for an electronic communication system, said program code comprising:
- program code for displaying a contact list search user interface display object to a user, said contact list search user interface display object including a plurality of independently selectable search options including a search contacts by attributes search option and a search groups by attributes search option;
- program code for displaying, responsive to said user selecting said search contacts by attributes search option, a user interface object enabling said user to search attributes associated with contacts in said contacts list to generate a result set of contacts having attributes matching a search query; and
- program code for displaying, responsive to said user selecting said search groups by attributes search option, a user interface object enabling said user to search attributes associated with groups in said contacts list to generate a result set of groups having attributes matching a search query.

16. A computer program product including a non-transitory computer readable storage medium, said non-transitory computer readable storage medium having program code stored thereon for providing quick searching of a contact list for an electronic communication system, said program code comprising:
- program code for displaying a contact list search user interface display object to a user, said contact list search user interface display object including a plurality of independently selectable search options including a search contacts by attributes search option and a search groups by attributes search option;
- program code for displaying, responsive to said user selecting said search contacts by attributes search option, a user interface object enabling said user to search attributes associated with contacts in said contacts list to generate a result set of contacts having attributes matching a search query; and
- program code for displaying, responsive to said user selecting said search groups by attributes search option, a user interface object enabling said user to search attributes associated with groups in said contacts list to generate a result set of groups having attributes matching a search query.

\* \* \* \* \*